UNITED STATES PATENT OFFICE.

JOHN B. ADAMS, OF CAMDEN, NEW JERSEY.

FUEL-BLOCK AND FIRE-KINDLER.

SPECIFICATION forming part of Letters Patent No. 344,891, dated July 6, 1886.

Application filed May 18, 1886. Serial No. 202,580. (Specimens.)

*To all whom it may concern:*

Be it known that I, JOHN B. ADAMS, a citizen of the United States, residing at Camden, in the county of Camden and State of New Jersey, have invented certain new and useful Improvements in Fuel-Blocks and Fire-Kindlers; and I do declare the following to be a full, clear, and exact description of the invention, such as will enable others skilled in the art to which it appertains to make and use the same.

This invention relates to certain improvements in fuel-blocks and fire-kindlers; and it has for its object to produce an article which will not shrink or crack under variations of temperature, so that it will be comparatively indestructible, and may be used subsequently, as more fully hereinafter specified.

In carrying out my invention I employ as a base clay from which all extraneous substances have been eliminated in any convenient manner. To this I add what I denominate "burnt stuff," and which consists of burned clay or fire-brick which has been subjected to heat or vitrified, so as to have lost its natural cohesion. By thus mixing the two characters of clay I obtain a compound which will not crack or break up under varying temperatures. To these ingredients I add carbon, either in the form of charcoal or coke, and mold the mass into suitable sizes for use.

In general practice the ingredients may be employed in any suitable proportions; but I have found the following-named proportions to answer well, viz: Clay, (prepared,) seven parts; burnt stuff, seven parts; charcoal, two parts, or charcoal one part, coke one part. These ingredients, having been well mixed, are molded into blocks of any size or shape, so as to be suitable for kitchen-ranges, fireplaces, parlor or bed-room stoves, or low-down grates, and the like. When the compound is properly molded into blocks, the same are baked until they may be handled and shipped for use. The blocks thus prepared are intended to be charged with fluid—head-light or other burning-oils—then placed in the fire-chamber of a range, stove, heater, or low-down grate. When this is done, the block or blocks are ignited by means of a burning match or torch.

The blocks may be made of any size or shape, so as to receive sufficient oil to cook, heat, or run a stationary engine, as well as to kindle coal-fires in winter-time without the use of kindling-wood.

By means of the burnt stuff all shrinkage and disintegration of the fuel is obviated, and a compound that will possess the requisite cohesion is obtained.

Having thus described my invention what I claim, and desire to secure by Letters Patent, is—

1. The burnt stuff as an ingredient for fire-kindlers, to prevent shrinkage or disintegration in the same, substantially as specified.

2. A fuel-block or fire-kindler composed of prepared fire-clay and burnt stuff, substantially as specified.

3. The method of preparing fuel-blocks or fire-kindlers, the same consisting in mixing prepared clay and burnt stuff, then molding the same into suitable forms, and finally burning, so as to secure a proper degree of porosity so as to absorb the burning-fluid, for use without ultimate destruction, substantially as specified.

In testimony whereof I affix my signature in presence of two witnesses.

JOHN B. ADAMS.

Witnesses:
CHAS. L. COOMBS,
M. P. CALLAN.